(12) United States Patent
Ohkoda

(10) Patent No.: US 6,934,361 B2
(45) Date of Patent: Aug. 23, 2005

(54) RADIOGRAPHIC APPARATUS

(75) Inventor: Keiji Ohkoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 10/197,597

(22) Filed: Jul. 18, 2002

(65) Prior Publication Data
US 2003/0021384 A1 Jan. 30, 2003

(30) Foreign Application Priority Data
Jul. 26, 2001 (JP) .......................... 2001-226133

(51) Int. Cl.$^7$ ................................. H05G 1/64
(52) U.S. Cl. .................. 378/98.8; 378/177; 378/209
(58) Field of Search .............. 378/98.8, 177, 378/209, 19, 179, 189, 190, 154, 155, 178, 197, 196; 250/370.09

(56) References Cited

U.S. PATENT DOCUMENTS

| 4,258,264 A |   | 3/1981  | Kotera et al. ........... 250/484 |
| 4,600,999 A |   | 7/1986  | Ito et al. ............... 364/507 |
| 4,807,273 A | * | 2/1989  | Haendle ................. 378/197 |
| 4,814,597 A |   | 3/1989  | Kruger et al. .......... 250/205 |
| 5,023,899 A | * | 6/1991  | Ohlson .................. 378/196 |
| 5,485,502 A | * | 1/1996  | Hinton et al. .......... 378/117 |
| 5,729,587 A | * | 3/1998  | Betz .................... 378/198 |
| 5,751,788 A |   | 5/1998  | Khutoryansky et al. .... 378/197 |
| 5,764,724 A | * | 6/1998  | Ohlson .................. 378/177 |
| 6,196,715 B1 |  | 3/2001  | Nambu et al. .......... 378/197 |
| 6,220,752 B1 | * | 4/2001 | Csikos et al. .......... 378/197 |
| 6,263,043 B1 |  | 7/2001  | Maschke ................. 378/63 |
| 6,341,156 B1 |  | 1/2002  | Baetz et al. ........... 378/98.8 |
| 6,341,893 B1 | * | 1/2002 | Matsumoto et al. ...... 378/209 |
| 6,447,164 B1 | * | 9/2002 | Polkus .................. 378/206 |
| 6,632,019 B2 | * | 10/2003 | Katoh .................. 378/197 |
| 6,669,365 B2 | * | 12/2003 | Iinuma .................. 378/195 |
| 2001/0033638 A1 | * | 10/2001 | Inoue ................. 378/154 |

FOREIGN PATENT DOCUMENTS

| DE | 197 40 533 B4 | 4/1999 |
| DE | 199 22 346 A  | 12/2000 |
| JP | 55-12429      | 1/1980 |
| JP | 56-11395      | 2/1981 |

* cited by examiner

Primary Examiner—Irakli Kiknadze
Assistant Examiner—Craig E. Church
(74) Attorney, Agent, or Firm—Fitzpatrick, Cella Harper & Scinto

(57) ABSTRACT

A radiographic apparatus includes a bed having a top board on which an object is to be placed, a radiation image detector for detecting intensity distribution of radiation transmitted through the object, and a supporting part arranged on the top board for supporting the radiation image detector at least at a position beneath the top board.

17 Claims, 9 Drawing Sheets

RADIOGRAPHIC APPARATUS

BACKGROUND OF THE INVENTION

1. Field of the Invention

The present invention relates to a radiographic apparatus for detecting, with an image detector, intensity distribution of radiation such as X-rays transmitted through an object such as a human organism.

2. Description of the Related Art

As a first method for obtaining a radiation image of an object, a so-called film/screen method is known. According to this method, which is most generally used, fluorescent screens, which are made from rare earth and radiate upon exposure with an X-ray, are placed and held in close contact with both surfaces of a radiographic sensitive film. The X-ray transmitted through an object is converted into a visual light ray by a phosphor, and the visual light ray in turn forms a latent image on the radiographic sensitive film so as to be developed and visualized by developing means.

A second method for obtaining a radiation image of an object, a so-called computed radiography (CR) method, also has been put to practical use. According to the computed radiography method, the intensity distribution of radiation (radiation image) transmitted through an object is temporarily stored within a phosphor as a latent image, and then, by irradiating exciting light onto the phosphor, the latent image is read out. For example, when being irradiated by radiation such as X-rays, α-rays, β-rays, γ-rays, electron rays, and ultra-violet rays, a type of phosphor stores part of energy of the radiation, and thereafter, when being irradiated by exciting light such as visible light, it radiates stimulated emission corresponding to the stored energy.

A radiation-image-information recording and reproducing system using such a phosphor called a cumulative phosphor or photostimulable phosphor is disclosed in Japanese Patent Laid-Open No. 55-12429 and Japanese Patent Laid-Open No. 56-11395. In such systems, the radiation image information of an object is temporarily recorded on a cumulative phosphor sheet, which in turn is scanned using exciting light such as laser light so as to produce stimulated emission light; an image signal is obtained by photoelectrically reading the obtained stimulated emission light, so that the radiation image of the object is visualized on the basis of the obtained image signal by utilizing a recording apparatus using a recording material such as a photosensitive material or utilizing a display such as a CRT.

A third method for obtaining a radiation image of an object uses a semiconductor sensor (also called as a semiconductor image detector or solid image pick-up elements) developed along with a recent technical progress in a semiconductor manufacturing process. In radiographic systems using the semiconductor sensor, the intensity distribution of radiation transmitted through an object is read out by photoelectric converting means with a wide dynamic range so as to convert it into an electric signal. Then, based on this electric signal, a radiation image is output as a visible image using a recording apparatus or display. Since the semiconductor sensor has a wide dynamic range so as to be able to detect a wide range amount of radiation, a radiographic system using the semiconductor sensor is much less likely to be affected by variations of the radiation exposure amount, enabling an excellent radiation image always to be obtained. This type of system has an advantage of being able to detect radiation images having the intensity distribution with an extremely wide range in comparison with systems using the film/screen method described above.

FIG. 11 shows the radiographic system using the semiconductor sensor described above as an example of a conventional radiographic system. A radiographic apparatus 1 having an examinee S placed thereon houses a radiographic image detector 2 having a detection surface with plural photoelectric conversion elements formed in a matrix arrangement. X-rays irradiated from an X-ray generator 3 are detected by the radiographic image detector 2 after transmitting through the examinee S. The image signal output from the radiographic image detector 2 is displayed on a monitor (display) 5 as a visualized X-ray image of the examinee S after digital image processing is performed thereon by image processing means 4. In addition, while X-rays have been described as an example of radiation, the radiation is not necessarily limited to X-rays.

When using any one of three methods described above, the radiographic system may have a grid, arranged between an examinee S and an X-ray receiver, for eliminating scattering X-rays produced inside the examinee S so as to improve contrast of X-ray images. The grid comprises plural sheets of foil with large X-ray absorptance, intermediate materials with small X-ray absorptance, the sheets and the materials being arrayed alternately in a stripe arrangement, and a cover member with large X-ray transmittance for covering the foil and intermediate materials.

The grid is arranged between the examinee S and the radiographic image detector 2 as shown in FIG. 11, for example. A primary X-ray, transmitted through the examinee S without being scattered by the examinee S, enters the intermediate material in the direction substantially along the foil surface of the grid, i.e., substantially parallel to the foil, so as to transmit through the intermediate material. Whereas a secondary X-ray scattered by the examinee S, i.e., a scattered X-ray, comes at an angle, not in parallel, with respect to the foil surface, so that a large portion thereof impinges upon the foil to be absorbed thereby. Therefore, the grid prevents the resolution of the radiographic system from degrading due to the scattered X-ray.

FIG. 12 shows a conventional radiographic apparatus using the first method described above and the grid, wherein a so-called bookie unit 12 is assembled in a vertically movable radiographic base 11 as a radiographic image detector. The radiographic base 11 comprises a base 13, in which the upper surface is vertically movable, and a cover 14 divided for covering side surfaces of the base 13. A top board 17 is supported on the upper surface of the base 13 movably in front-and-back and right-and-left directions via a pair of rails 15 and a pair of rails 16. The bookie unit 12 is supported on the upper surface of the base 13 movably in the right-and-left direction via a pair of rails 18.

The bookie unit 12 comprises a cassette detachably housed therein as an X-ray receiver for containing a film and phosphor therein, a so-called bookie part housed therein for constituting a grid held movably in parallel for eliminating scattered X-rays, and a cover 12a made of a material with high X-ray transmittancy and arranged in the upper part thereof.

As an examinee is lying on the top board 17, when the weight of the examinee is 100 kg, for example, the top board 17 deflects downwardly by 10 to 20 mm. Accordingly, it is required to have a clearance more greater than the deflection between the top board 17 and the bookie unit 12. In general, increasing the clearance between an examinee and the X-ray receiver (the bookie unit 12) causes the obtained X-ray image to become blurred so that the resolving power (MTF) is reduced. Therefore, it is not preferable to increase the clearance.

Also, even when the bookie unit 12 is moved in the left utmost while the top board 17 is simultaneously moved in the right utmost, the left end of a film within the bookie unit 12 cannot be positioned in the vicinity of the left end of the top board 17, so that there is a problem to make a film of an end part of the examinee that is lying down. That is, while a film can easily be made by the bookie unit 12 of the part of the examinee ranging from the cervical spine to thigh, the bookie unit 12 cannot easily make a film of the end parts (the upper end or lower end) or extremities of the examinee, such as the head and lower limbs.

In such a case, instead of using the bookie unit 12, it is necessary to arrange a film cassette on the top board 17 so as to make the examinee be recumbent thereon. Moreover, it may be burdensome for an operator or examinee to properly arrange or to finely adjust the film cassette position relative to the recumbent examinee. For example, the operator may have to do the heavy work of lifting a handicapped examinee, or the examinee may experience pain.

SUMMARY OF THE INVENTION

The present invention has been made in view of the problems described above, and it is an object of the present invention to provide a radiographic apparatus capable of obtaining excellent images or of taking images efficiently.

According to the present invention, the foregoing object is attained by providing a radiographic apparatus comprising a bed having a top board, on which an object is to be placed; a radiation image detector for detecting intensity distribution of radiation transmitted through the object; and a supporting part disposed in the top board for supporting the radiation image detector at least at a position beneath the top board.

Further objects, features and advantages of the present invention will become apparent from the following description of the preferred embodiments with reference to the attached drawings.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DESCRIPTION OF THE PREFERRED EMBODIMENTS

Preferred embodiments of the present invention will be described in detail with reference to FIGS. 1 to 10. In addition, the embodiments will be described by exemplifying a medical radiographic apparatus for taking images of an examinee using X-rays (radiographic apparatus); however, the present invention may be applicable to a radiographic apparatus for taking images of other objects, or to a radiographic apparatus using any other type of radiation.

Figure 1:
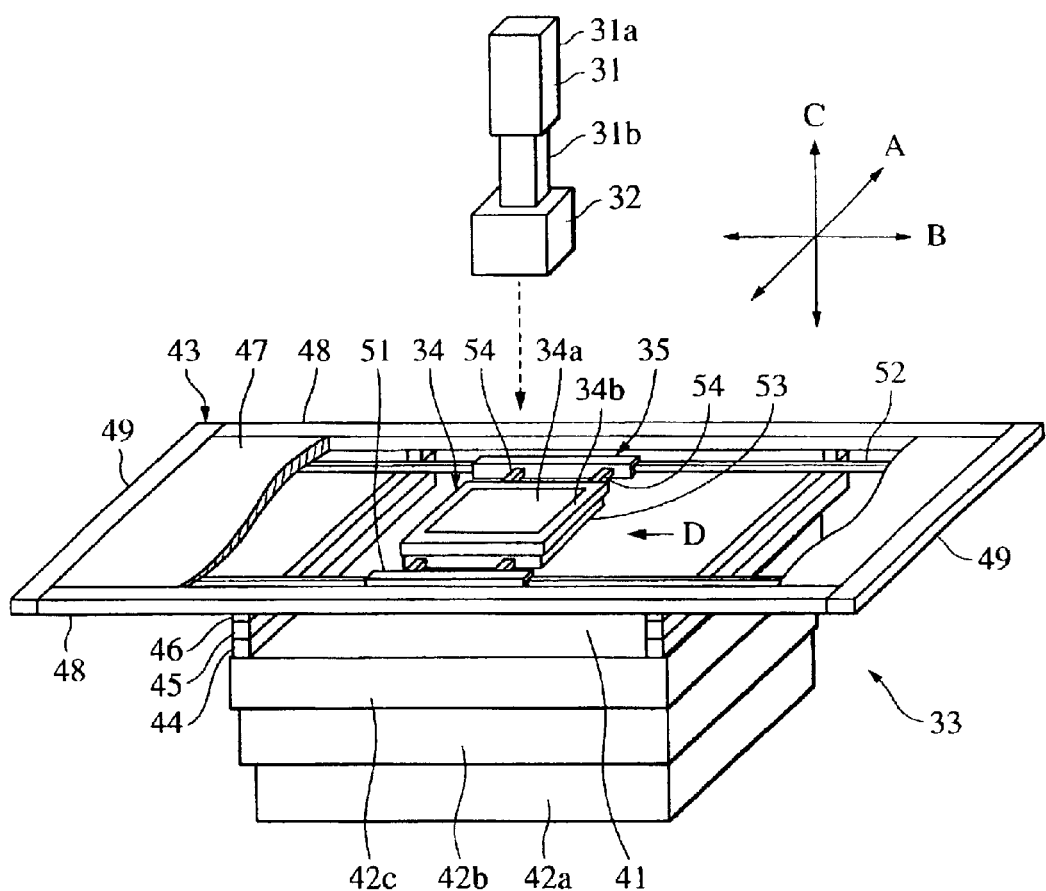
FIG. 1 is a perspective view of a first embodiment.

FIG. 1 is a perspective view of a first embodiment. A radiographic apparatus according to the embodiment comprises a supporting mechanism 31 hanging down from a ceiling of a radiographic room, an X-ray tube 32 supported to the lower part of the supporting mechanism 31, a bed (table for taking images, here) 33 arranged underneath the X-ray tube 32, a radiographic image detector 34 for detecting X-rays transmitted through an examinee, a holding mechanism 35 for holding the radiographic image detector 34 movably relative to the bed 33, and a grid unit 36 (not visible in this figure) for eliminating scattered X-rays, which will be described below with reference to other figures.

The supporting mechanism 31 comprises a horizontal moving member 31a, which is supported to the ceiling movably in the front-and-rear and right-and-left directions shown by the arrows A and B, and a vertical moving member 31b supported to the horizontal moving member 31a movably in the vertical direction shown by the arrow C. The X-ray tube 32 is supported to the vertical moving member 31b and is movable in three-dimensional directions by the supporting mechanism 31. In addition, the X-ray tube 32 is configured so as to discharge X-rays in the direction shown by the broken-line arrow for irradiating an examinee lying down on the bed 33.

The bed 33, for example, uses a vertically movable floating table, which comprises a base 41 with the upper surface vertically movable relative to a floor of the radiographic room and three covers 42a, 42b, and 42c for covering side surfaces of the base 41. On the upper surface of the base 41, a top board 43 is supported horizontally movably in front-and-back and right-and-left directions for placing an examinee so as to lie thereon, interposing a bilateral pair of rails 44, a bilateral pair of rails 45, and a pair of fixing members 46 on either side therebetween. The top board 43 has a top-board body 47 made of a material with high X-ray transmittancy such as acrylics, polycarbonate, carbon, or lumber. Four sides of the top-board body 47 are surrounded with front-and-rear frames 48 and right-and-left frames 49, and the fixing members 46 are fixed to the front-and-rear frames 48.

Although not shown, the supporting mechanism 31 includes positional sensors for respectively detecting positions of the X-ray tube 32 in front-and-back and right-and-left directions. The bed 33 comprises a driving mechanism for changing the upper surface of the base 41 in height, a positional sensor for detecting a height of the upper surface of the base 41 (a position in the vertical direction), and positional sensors for respectively detecting positions of the top board 43 in front-and-back and right-and-left directions.

The radiographic image detector 34 houses a large-sized radiographic detecting part (solid image pick-up elements, not shown), which is also called a flat panel sensor. The radiographic detecting part, made by use of a semiconductor manufacturing process technique, is configured to have plural photoelectric conversion elements or X-ray detection elements arrayed in a two-dimensional arrangement (matrix arrangement). The radiographic detecting part has a detection surface with a size of approximately 43 cm×43 cm. The radiographic image detector 34 comprises a cover member 34a, arranged on the top surface thereof and made of a material with high X-ray transmittancy, and a casing 34b for optically hermetically containing the radiographic detecting part in collaboration with the cover member 34a. As will be described later, since the radiographic image detector 34 is urged or biased toward the bottom surface (lower surface in the vertical direction) of the top board 43, the surface (upper surface) of the radiographic image detector 34 is smoothly finished so as to reduce, as much as possible, the frictional force produced on the contact part between the radiographic image detector 34 and the top board 43. In addition, the frictional force may also be reduced by interposing a rolling member between the radiographic image detector 34 and the top board 43.

In the holding mechanism 35, a pair of rails 52 slidably having long-cylindrical (long square column, for example) carriages 51 are arranged inside the front-and-rear frames 48 of the top board 43 so as to extend in the right and left direction, and both ends of the pair of rails 52 are respectively fixed to the right-and-left frames 49 of the top board 43. Also, a pair of rails 54 slidably having a square plate-like carriage 53 are arranged between the carriages 51, and both ends of the pair of rails 54 are respectively fixed to the front-and-rear carriages 51.

Figure 2:
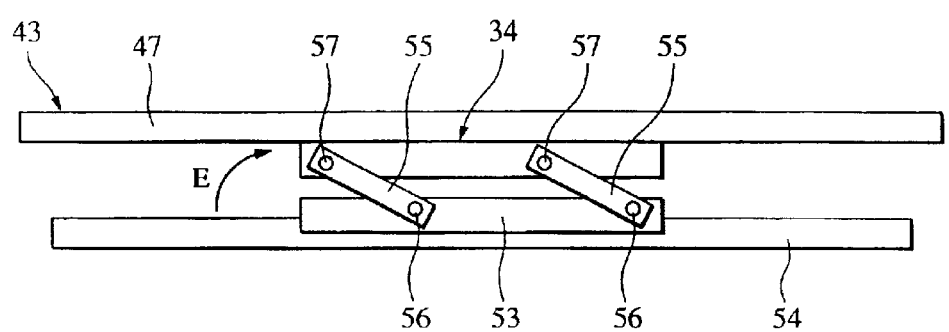
FIG. 2 is a detailed drawing viewed in the arrow D direction of FIG. 1.

FIG. 2 is a detailed drawing viewed in the arrow D direction of FIG. 1, wherein the radiographic image detector 34 is supported to the carriage 53 via a link mechanism and is urged or biased to the top-board body 47. That is, the lower ends of two links 55 for each bilateral side are connected to the carriage 53 via journals 56 while the upper ends of the links 55 are connected to the radiographic image detector 34 via journals 57. To the links 55, a moment is applied in the E direction by urging means or biasing means using an elastic member such as a spring, so that the radiographic image detector 34 is urged or biased on the bottom surface of the top-board body 47. The radiographic image detector 34 always comes close to the examinee, and when the top-board body 47 deflects downwardly due to the weight of the examinee, the radiographic image detector 34 is configured to thereby descend by a height corresponding to the deflection of the top-board body 47 while retaining a horizontal posture.

Figure 3:
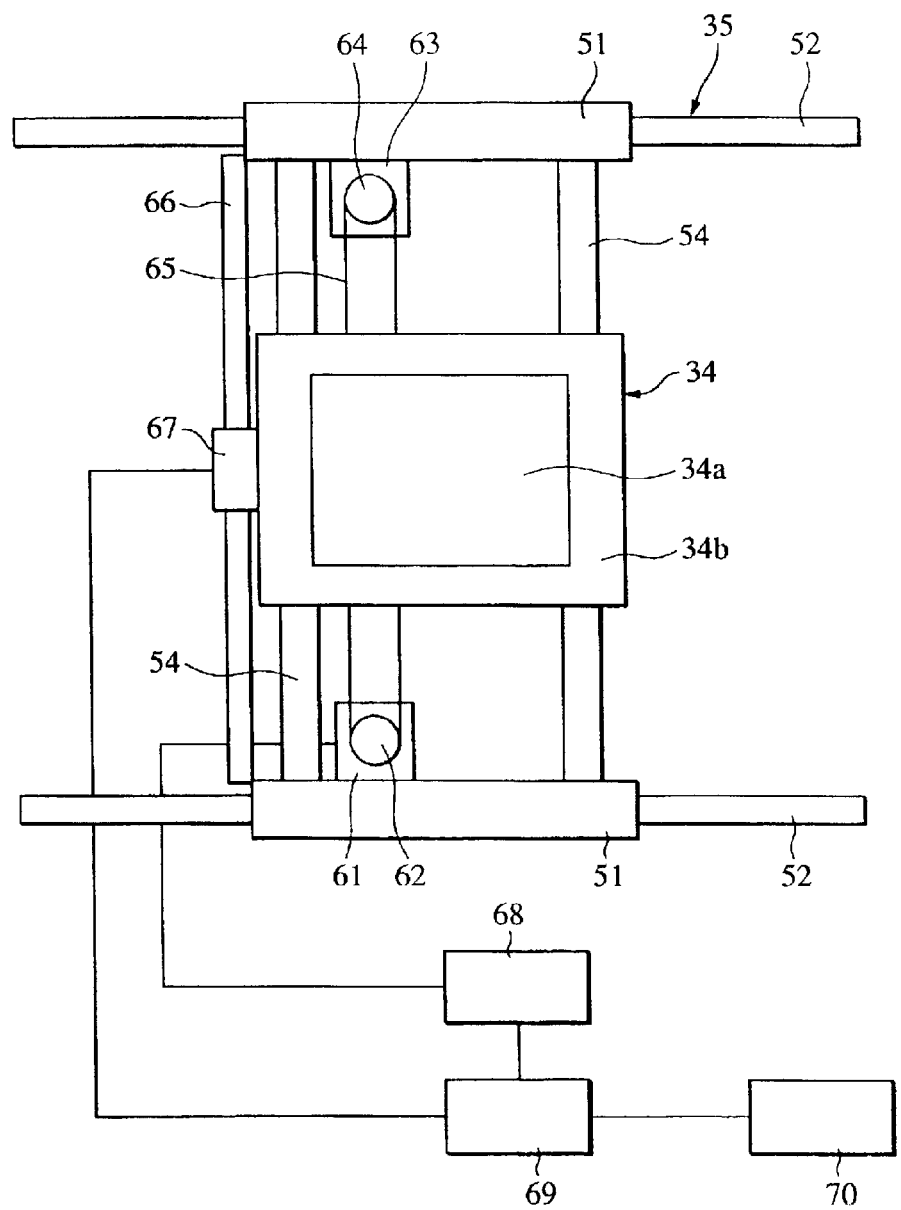
FIG. 3 is a schematic representation of a holding mechanism and an electric circuit.

FIG. 3 is a schematic representation of the holding mechanism 35 and an electric circuit, wherein the front carriage 51 is provided with a driving source 61 such as a DC motor or pulse motor, and a driving shaft of the driving source 61 is provided with a driving pulley 62 fixed thereto, while the rear carriage 51 is provided with a driven pulley 64 disposed therein via a fixed base 63. A timing belt 65 is wound around the driving pulley 62 and the driven pulley 64, and a predetermined part of the timing belt 65 is fixed to the carriage 53. The driven pulley 64 has urging means (not shown) and is configured so as to apply a desired tension to the timing belt 65 because of a function of the urging means. Thereby, the radiographic image detector 34 is moved rearwardly when the driving pulley 62 rotates in the right, and when rotating in the left, the radiographic image detector 34 is moved forward the front.

Between the front-and-rear carriages 51, a scale 66 of a linear encoder is stretched while a sensor 67 of the linear encoder is attached to the carriage 53. That is, the linear encoder constitutes the scale 66 and the sensor 67, wherein by reading a pattern of the scale 66, the sensor 67 produces a pulse signal corresponding to the movement of the carriage 53 and a signal indicating a moving direction while adding and subtracting the pulse in consideration of the moving direction, so that the position of the carriage 53 is detected and output.

The driving source 61 is connected to a controller 68 for controlling the driving source 61, and a comparator circuit 69 is connected to the controller 68. To the comparator circuit 69, the sensor 67 for detecting a position of the radiographic image detector 34 in the front-and-rear direction and a front-and-rear positional sensor 70 for detecting a position of the X-ray tube 32 in the front-and-rear direction are connected. Similarly, to the controller 68 also connected are each driving source of the supporting mechanism 31 and each positional sensor (including the above-mentioned positional sensor 70) corresponding to each driving source and each driving direction of the supporting mechanism 31, a right-and-left positional sensor for detecting a position of the radiographic image detector 34 in the right-and-left direction, a driving source for changing a top surface height of the base 41, a vertical positional sensor for detecting the top surface height thereof, and each sensor for detecting positions of the top board 43 in the front-and-rear and right-and-left directions. The controller 68 is also provided with a switch part (input part) for operating each part and for setting a series of controls disposed therein or connected thereto. On the basis of the operation and setting, the controller 68 controls each part so that the X-ray tube 32 and the radiographic image detector 34 are arranged to have a predetermined positional relationship therebetween.

Therefore, when the position of the radiographic image detector 34 deviates from a predetermined position determined as corresponding to the position of the X-ray tube 32, for example, the controller 68 controls each driving source (the driving source 61, etc.) based on a signal from the comparator circuit 69, for example, a signal indicating the compared result of the signal of a positional deviation (vector quantity) of the radiographic image detector 34, in each moving direction (movable direction) so as to make the position of the radiographic image detector 34 agree with a predetermined position corresponding to the X-ray tube 32 position. In addition, the case has been described, in which the radiographic image detector 34 is driven so that it is located at a predetermined position corresponding to the X-ray tube 32. However, the radiographic apparatus according to this embodiment may also be configured so that the X-ray tube 32 is driven so that it is located at a predetermined position corresponding to the radiographic image detector 34. Alternatively, the X-ray tube 32 and/or the radiographic image detector 34 may be driven so that they are located at a predetermined position corresponding to a predetermined part (region) to be radiographed of an examinee.

Figure 4:
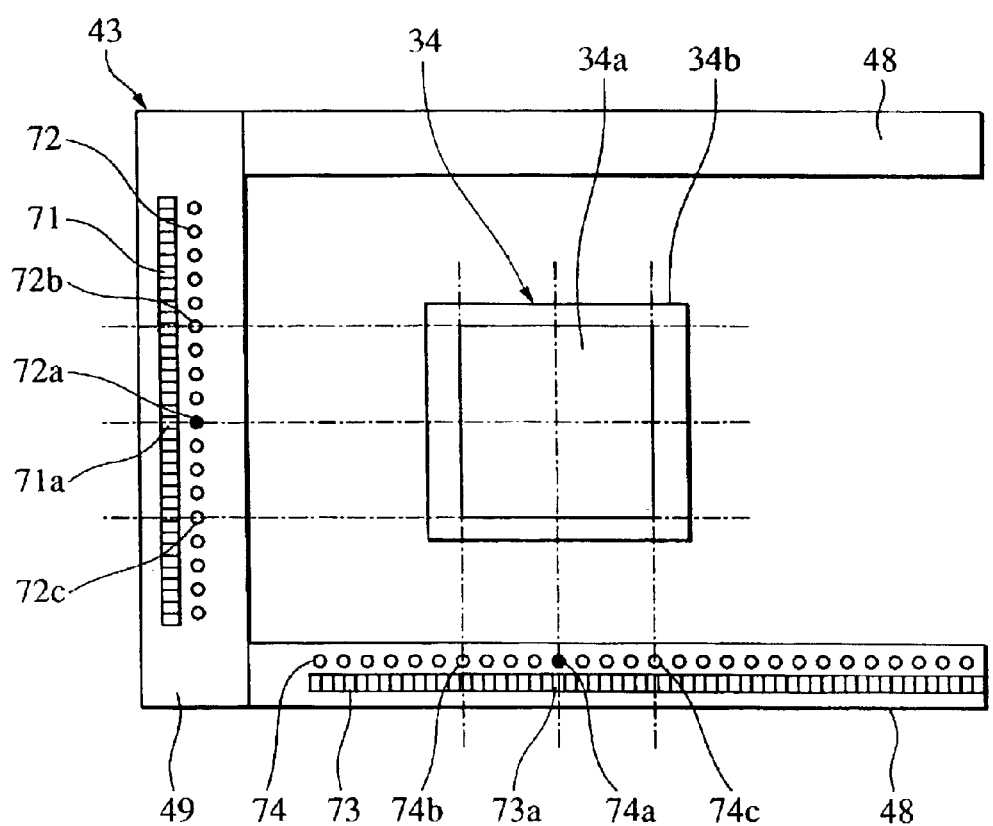
FIG. 4 is a schematic representation of a user interface.

FIG. 4 is a schematic representation of a user interface, wherein the left frame 49 of the top board 43 is provided with a switch train 71 to be operated when moving the radiographic image detector 34 in the front-and-rear direction while a display lamp train 72 is located in parallel to the switch train 71 for indicating the center and range of an image-receiving region of the radiographic image detector 34. The front frame 48 of the top-board body 47 is provided with a switch train 73 to be operated when moving the radiographic image detector 34 in the right-and-left direction while a display lamp train 74 is arranged in parallel to the switch train 73 for indicating the center and range of the image-receiving region of the radiographic image detector 34.

When an operator pushes switches 71a and 73a among the switch trains 71 and 73, the controller 68 moves the radiographic image detector 34 by controlling drive of the holding mechanism 35 to make the center of the image-receiving region of the radiographic image detector 34 agree with a position corresponding to the position of the switches 71a and 73a. Meanwhile, among the display lamp trains 72 and 74, lamps that are turned on are display lamps 72a and 74a corresponding to the center of the image-receiving region of the radiographic image detector 34, display lamps 72b and 72c indicating the range in the front-and-rear direction of the image-receiving region of the radiographic image detector 34, and display lamps 74b and 74c indicating the range in the right-and-left direction of the image-receiving region of the radiographic image detector 34. Thereby, the radiographic image detector 34 can be readily moved at a desired position while the operator can easily recognize the position and range of the image-receiving region of the radiographic image detector 34. At this time, among the turned-on display lamps 72b to 72c and 74b to 74c, the central display lamps 72a and 74a indicate the center of the image-receiving region of the radiographic image detector 34, and the front-and-rear display lamps 72b and 72c and the right-and-left display lamps 74b and 74c indicate the ranges in the respective directions of the image-receiving region of the radiographic image detector 34.

In addition, the position of the radiographic image detector 34 may be recognizable furthermore readily by turning on any one of the lamps indicating the center of the image-receiving region and the lamps indicating both ends thereof while flashing the other lamps on and off. Also, the lamp indicating the center of the image-receiving region and the lamps indicating both ends may be made more clearly recognizable by using two-color light emitting elements instead of the lamps to differentiate the color of the light emitting element indicating the center of the image-receiving region from the color of the light emitting elements indicating both ends. Also, when the position of the radiographic image detector 34 is automatically controlled to track the X-ray tube 32, which is manually moved by an operator, the display lamp trains 72 and 74 may be configured to turn on and show the center and/or range of the image-receiving region corresponding to the movement of the radiographic image detector 34.

Figure 5:
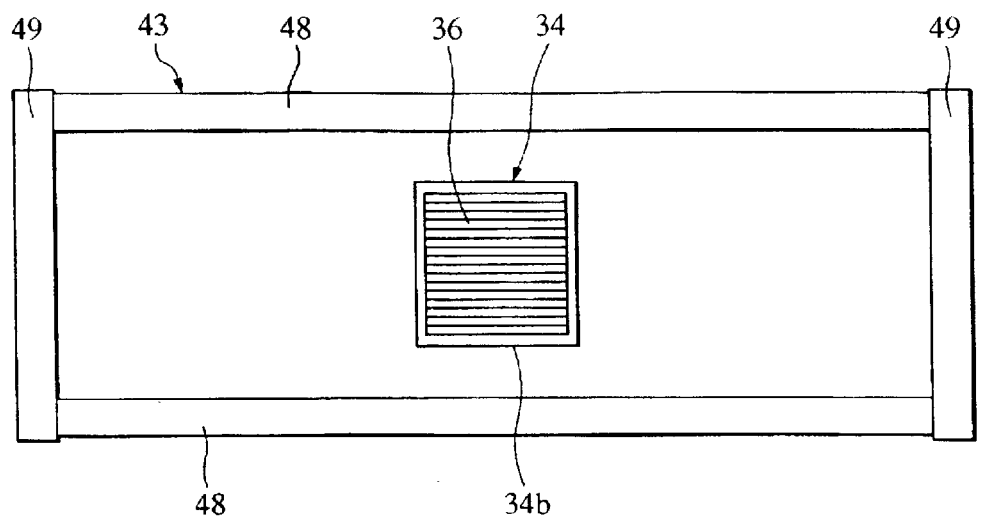
FIG. 5 is a plan view for illustrating a position of a grid.

FIG. 5 is a plan view for illustrating the operation of the grid unit 36, wherein the top board 43 is shown by omitting the top-board body 47. In general, the grid unit 36 is positioned directly above the radiographic image detector 34 as well as directly below the top board 43. The grid unit 36 may be a fixed grid unit where the grid is not moved during radiographing, or it may also be a grid unit having a so-called bookie mechanism where the grid is moved during radiographing. Also, the grid unit 36 may be integrally formed with a supporting mechanism (not shown) on the radiographic image detector 34, or it may be arranged movably from a position on the radiographic image detector 34 to a position off the radiographic image detector 34 by a moving mechanism (not shown).

Figure 6:
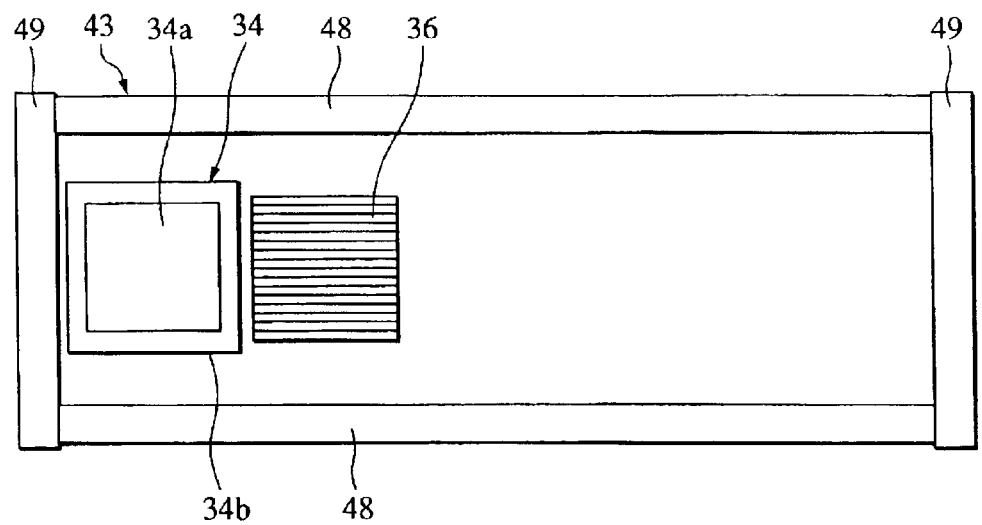
FIG. 6 is a plan view of an X-ray detector in a state of moving in the left.
Figure 7:
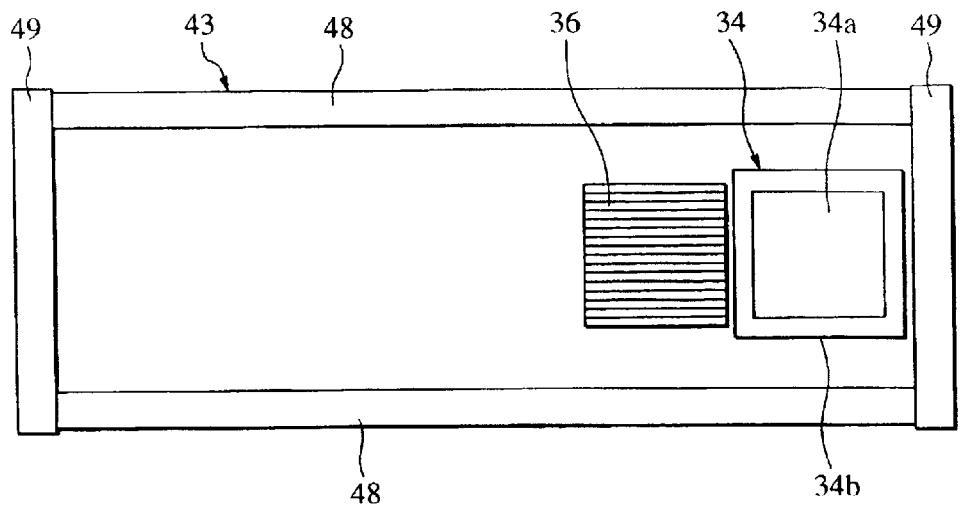
FIG. 7 is a plan view of the X-ray detector in a state of moving in the right.

There are some parts of an examinee to be radiographed that do not require the grid for eliminating scattered rays because of the small amount of the scattered X-ray due to a thin body thickness. Therefore, it is effective to arrange the grid unit 36 so that it may be withdrawn from the radiographic image detector 34. In this case, as shown in FIG. 6, when the radiographic image detector 34 moves to the left end of the top board 43, the grid unit 36 may preferably be withdrawn to the right side of the radiographic image detector 34; as shown in FIG. 7, when the radiographic image detector 34 moves to the right end of the top board 43, the grid unit 36 may preferably be withdrawn to the left side of the radiographic image detector 34. When the grid unit 36 withdraws to a side of the radiographic image detector 34, the radiographic image detector 34 is moved so as to come or to be urged (biased) in contact on the bottom surface of the top board 43 by the above-mentioned urging means or biasing means.

During normal radiographing (although not limited thereto), the controller 68 positions the X-ray tube 32 perpendicularly above the image-receiving surface (detection surface) in the center of the image-receiving region of the radiographic image detector 34 to have a predetermined distance between the X-ray producing position (focal point) of the X-ray tube 32 and the detection surface of the radiographic image detector 34 by controlling the supporting mechanism 31, etc. When manually moving the top board 43 in the front-and-rear and/or right-and-left directions in order to change the part of an examinee to be radiographed, the controller 68 moves the radiographic image detector 34 without changing the position relative to the X-ray tube 32 by computing a movement vector of the top board 43 based on a signal from the positional sensor of the top board 43 so as to control the holding mechanism 35 to cancel the movement vector. Also, when changing the top surface height of the base 41, the controller 68 controls the supporting mechanism 31 so as to maintain a predetermined distance between the focal point of the X-ray tube 32 and the image-receiving surface (detection surface) of the radiographic image detector 34.

According to the first embodiment, since the radiographic image detector 34 is configured by using the radiographic detecting part constituting solid image pick-up elements, a film cassette need not be put-on and taken-off a radiographing base, as before. Simultaneously, the top board 43 is provided with the holding mechanism 35 as described above, so that the radiographic image detector 34 can be moved over the substantially entire range of the top board 43 by the holding mechanism 35, enabling a substantially arbitrary part of an examinee existing on the top board 43 to be radiographed. Therefore, in contrast to a conventional apparatus, in which the film cassette is arranged on the top surface of the top board 43 to radiograph the examinee, according to the embodiment, without affecting the examinee (giving a disagreeable impression, for example), the radiographic image detector 34 can be moved, so that an arbitrary part or plural parts of the examinee can be radiographed promptly with high image quality, reducing strain on the examinee and the operator and improving radiographing work efficiency.

Instead of moving the radiographic image detector 34 to a position corresponding to that of the X-ray tube 32, the X-ray tube 32 may be moved to a position corresponding to that of the radiographic image detector 34 by controlling the supporting mechanism 31 based on a detected signal from a positional detection sensor (the sensor 67, etc.) of the radiographic image detector 34. Also, by using the switch trains 71 and 73, a position of the radiographic image detector 34 may be made to coincide with a position corresponding to that of the X-ray tube 32. A target position, corresponding to a target body part of an examinee to be radiographed, is input through the above-mentioned input part, so that the X-ray tube 32 and the radiographic image detector 34 may also be moved to the respective positions corresponding to the target position.

Furthermore, by controlling at least one of the driving source of the base 41 and the driving source of the supporting mechanism 31 based on outputs of the sensor for detecting the position of the X-ray tube 32 in the vertical direction and the sensor for detecting the top surface height of the base 41, the spacing between the focal point of the X-ray tube 32 and the image-receiving surface of the radiographic image detector 34 can be controlled so as to have or maintain a predetermined distance corresponding to a target part to be radiographed or a radiographing method.

Using the radiographic apparatus according to the embodiment, so-called tomography, in which a predetermined sectional surface of an examinee is radiographed, can be performed by irradiating an X-ray thereon continuously or intermittently while moving the X-ray tube 32 and the radiographic image detector 34 maintaining a predetermined positional relationship between them interposing the examinee therebetween, while the X-ray tube 32 and the radiographic image detector 34 are simultaneously moved along respective predetermined trajectories.

Figure 8:
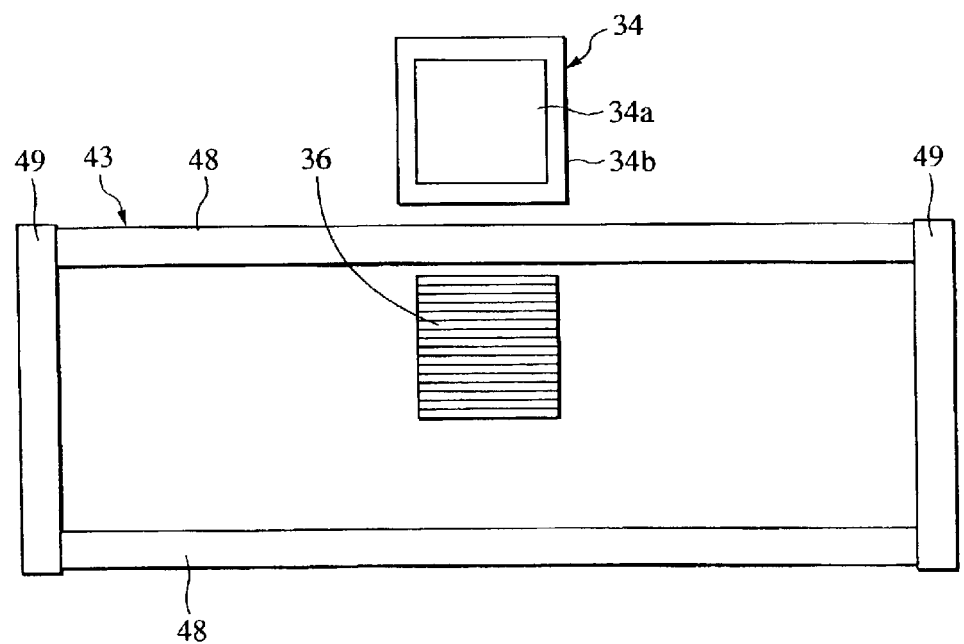
FIG. 8 is a plan view of a characteristic part of a second embodiment.

FIG. 8 is a plan view of an essential part of a second embodiment of the present invention, wherein like reference characters designate like members common to those of the first embodiment, and a detailed description thereof is omitted. According to the second embodiment, when the radiographic image detector 34 is moved outside the top board 43 in the front-and-rear direction, for example, the grid unit 36 can remain inside the top board 43. FIG. 8 shows a state that the radiographic image detector 34 is drawn out so as to be outside the longer side of the top board 43 by a moving mechanism or guide mechanism (not shown), wherein, although it is shown that only the radiographic image detector 34 is drawn out while the grid unit 36 remains inside the top board 43, the grid unit 36 and the radiographic image detector 34 are selectable to be integrally drawn out by a mechanism (not shown).

The second embodiment is advantageous because a target part to be radiographed with a small amount of scattered X-rays (the four limbs, typically) can be radiographed by more closely approaching the object without the top board 43 and the grid unit 36 interposed therebetween. When the grid unit 36 is drawn out so as to be outside the top board 43 together with the radiographic image detector 34, although the grid unit 36 is interposed, the apparatus is still advantageous in image quality (resolving power) as can be radiographed without the top board 43 interposed therebetween. In addition, the radiographic image detector 34 may also be configured to be moveable outside the top board 43 in the right-and-left direction (longitudinal direction), not in the front-and-rear direction (shorter side).

Figure 9:
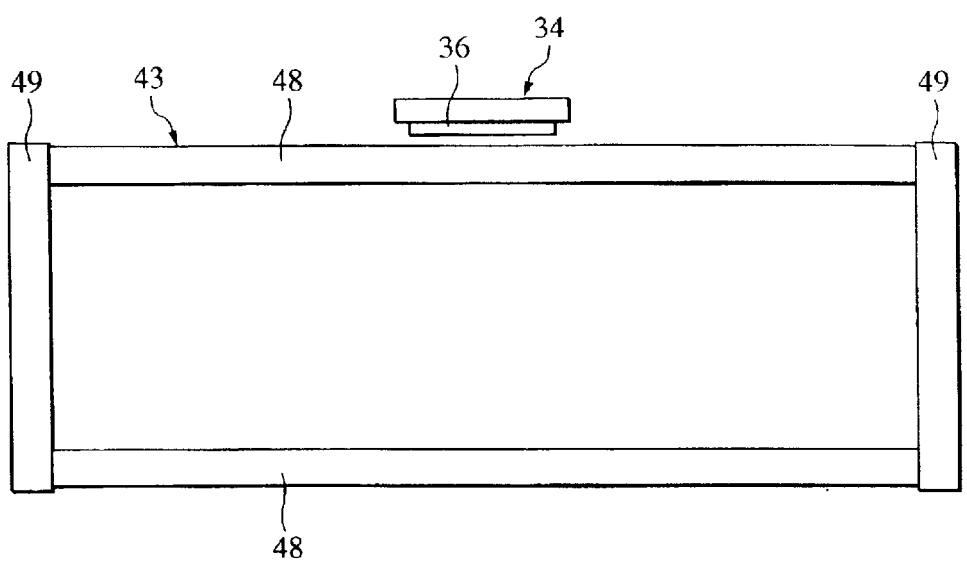
FIG. 9 is a plan view of a characteristic part of a third embodiment.

FIG. 9 is a plan view of an essential part of a third embodiment of the present invention, wherein like reference characters designate like members common to those of the first embodiment, and a detailed description thereof is omitted. According to the third embodiment, after the radiographic image detector 34 moves outside the top board 43, the detection surface (image-receiving surface) of the radiographic image detector 34 is upwardly rotatable by 90° so as to be perpendicular to the top surface of the top board 43. Also, the grid unit 36 is movable integrally with the radiographic image detector 34. According to the third embodiment, the side of an examinee lying on his or her back or his or her stomach can be radiographed. Moreover, the examinee can be radiographed from the side perpendicular to the vertical direction.

Figure 10:
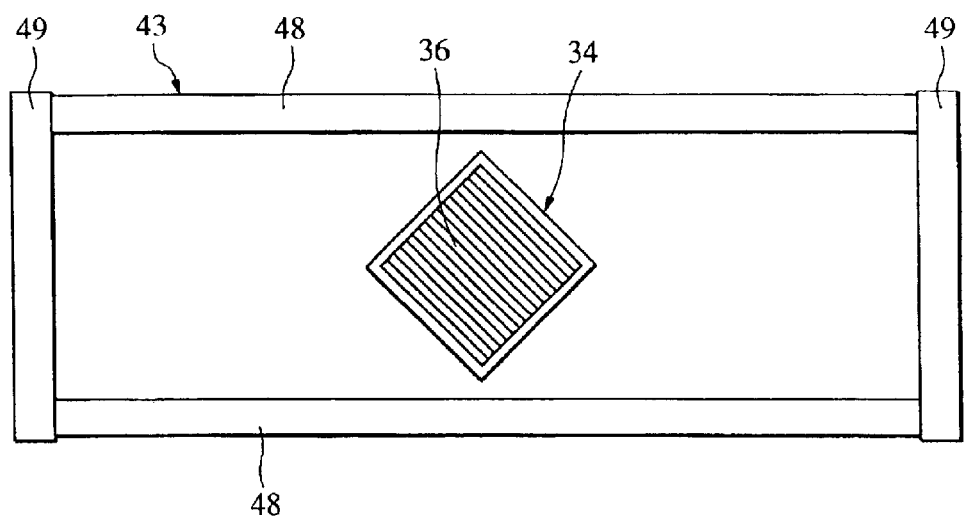
FIG. 10 is a plan view of a characteristic part of a fourth embodiment.
Figure 11:
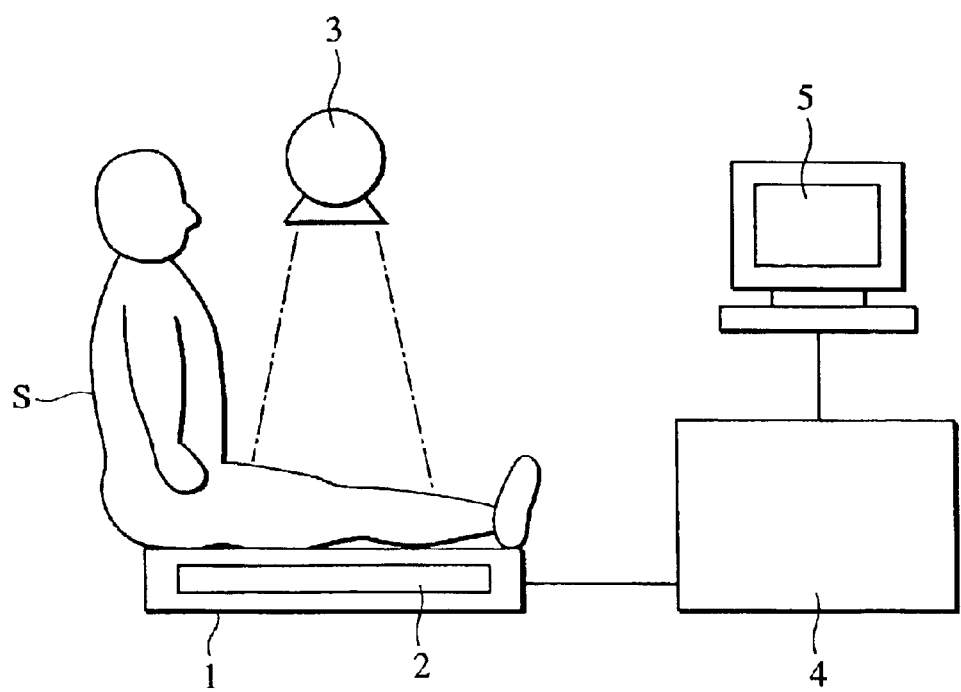
FIG. 11 is a schematic drawing of a conventional radiographic system.
Figure 12:
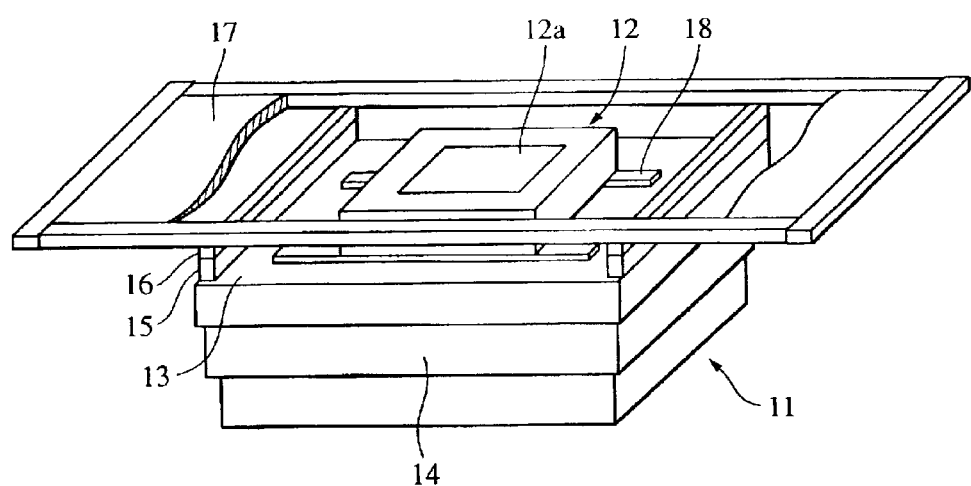
FIG. 12 is a perspective view of a conventional radiographic apparatus.

FIG. 10 is a plan view of an essential part of a fourth embodiment of the present invention, wherein like reference characters designate like members common to those of the first embodiment, and a detailed description thereof is omitted. According to the fourth embodiment, in addition to the structure that is the same as the first embodiment, there is provided a rotatable supporting mechanism for supporting the radiographic image detector 34 rotatably by 45° about an axis perpendicular to the image-receiving surface of the radiographic image detector 34. According to the fourth embodiment, when radiographing a long target part to be radiographed (the four limbs, for example) of an examinee, a diagonal line of the radiographic image detector 34 can be aligned with the longitudinal direction of the target part of the examinee, so that the target part can be more widely contained within a radiographing region (image-receiving region).

In addition, the radiographic apparatus according to the first to fourth embodiments described above may of course be modified in various ways within the scope of the appended claims.

For example, the bed 33 has been described as a vertically movable floating table. However, it may be a table with the vertically immovable top board 43 or a table with the horizontally immovable top board 43, as long as it has the top board 43 which can allow an examinee to lie thereon. The bed 33 may also be a so-called tiltable type, which can support the top board 43 in an inclined state.

Also, instead of the bed 33, an operating table, a bed for an ICU (intensive care unit), and an emergency stretcher may be used. These cases are promptly applicable to an examinee in an emergency, so that X-ray images can be more readily and promptly obtained in comparison with the radiographing using a cassette inserted under the examinee. The apparatus can also be systematically combined with other apparatuses such as a surgical C-arm type apparatus having a television camera with an II (image intensifier), fluoroscopy apparatus, or the like.

Moreover, according to the embodiments, the radiographic image detector 34 is configured to vertically move corresponding to the deflection of the top board 43. Alternatively, the deflection of the top board 43 may also be suppressed due to the rigidity of the radiographic image detector 34 and the holding mechanism 35. By virtue of such a structure, the weight of an examinee can be supported even when reducing the rigidity of the top board 43, so that the thickness of the top board 43 can be reduced. In this case, since the radiographic image detector 34 approaches the examinee more closely, the X-ray image quality (resolving power or MTF of the radiographic apparatus) can be improved.

The top-board body 47 is made of a material with high X-ray transmittancy such as acrylics, polycarbonate, carbon, or lumber according to the embodiments. It is preferable that electromagnetic noise can be prevented from affecting the radiographic image detector 34 by making the top-board body 47 of a material or structure that can shield predetermined electromagnetic waves.

The radiographic apparatus according to the embodiments described above has advantages as follows:

(1) The radiographic image detector 34 can be arranged at a desired position over substantially the entire region of the bottom surface of the top board 43 without bringing the radiographic image detector 34 into contact with an examinee. Therefore, arbitrary widely ranging parts of the examinee can readily be radiographed in a short amount of time while improving radiographing efficiency by reducing the stress and strain applied to the examinee and the operator.

(2) Since the radiographic image detector 34 can be brought close to an examinee, high quality radiographic images can be obtained. Also, the radiographic image detector 34 can be brought as close to the examinee as possible interposing the top board 43 therebetween by urging (biasing) the radiographic image detector 34 on the bottom surface of the top board 43, so that while high quality radiographic images can be obtained, the radiographic image detector 34 can descend correspondingly to the deflection of the top board 43 due to the weight of the examinee maintaining a state that the radiographic image detector 34 is in contact with the bottom surface of the top board 43.

(3) The grid unit 36 for removing scattered X-rays can selectively be used, so that the radiography can properly be performed.

(4) The radiographic image detector 34 can be drawn out from under the top board 43, or while the radiographic image detector 34 can be drawn out from under the top board 43, the grid unit 36 can be selectively used, so that the apparatus is properly applicable to a more wide range of parts or radiographing methods such as radiographing of the four limbs of an examinee.

(5) While the radiographic image detector 34 is drawn out from under the top board 43, the image-receiving surface of the detector can be aligned in the vertical direction, so that an examinee can be radiographed from the side, as opposed to the vertical direction.

(6) A diagonal line of a quadrangle detection surface (image-receiving surface) of the radiographic image detector 34 can be aligned with a longitudinal direction of a target part of an examinee, so that a long target part of the examinee can be more widely contained within a radiographing region.

(7) The radiographic image detector 34 can be moved automatically in accordance with the information corresponding to a position of a target part to be radiographed of an examinee or the X-ray tube 32.

(8) The X-ray tube 32 can be moved automatically in accordance with the information corresponding to a position of a target part to be radiographed of an examinee or the radiographic image detector 34.

(9) A desired position (position after movement) of the radiographic image detector 34 can easily be input from the input part disposed in the top board 43.

(10) Positional information of a detection region (image-receiving region) of the radiographic image detector 34 can be displayed on the top board 43, so that an operator can easily recognize the detection region.

(11) A target part to be radiographed of an examinee requiring emergency treatment can be radiographed promptly.

(12) When moving the top board 43 for supporting the radiographic image detector 34, the radiographic image detector 34 can be moved relative to the top board 43 as the radiographic image detector 34 is not moved relative to the X-ray tube 32.

As described above, by virtue of the radiographic apparatus according to the embodiments, excellent images can be obtained and efficient radiographing can be performed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A radiographic apparatus comprising:
   a top board for placing an object;
   a top board moving mechanism for moving said top board in a horizontal direction;
   a supporting mount for mounting said top board moving mechanism;
   a radiation image detector for detecting intensity distribution of radiation transmitted through the object; and
   a detector moving mechanism for moving said radiation image detector in the horizontal direction;
   wherein said detector moving mechanism is mounted on a movable side of said top board moving mechanism.

2. An apparatus according to claim 1, wherein said radiation image detector comprises either photoelectric conversion elements or radiation detection elements, which are arrayed in a matrix arrangement.

3. An apparatus according to claim 1, wherein said detector moving mechanism supports said radiation image detector movably along a bottom surface of said top board.

4. An apparatus according to claim 1, wherein said detector moving mechanism supports said radiation image detector movably in a direction along a bottom surface of said top board and in a vertical direction.

5. An apparatus according to claim 1, wherein said detector moving mechanism supports said radiation image detector movably beneath said top board and substantially throughout the entire region of said top board.

6. An apparatus according to claim 1, further comprising a removal member detachably disposed between said top board and said radiation image detector for removing scattered radiation.

7. An apparatus according to claim 6, wherein said removal member can withdraw in any one of two directions longitudinally along said top board from between said top board and said radiation image detector.

8. An apparatus according to claim 1, wherein said detector moving mechanism supports said radiation image detector movably outside a region beneath said top board.

9. An apparatus according to claim 8, wherein said detector moving mechanism supports said radiation image detector, which has been moved outside the region, rotatably so as to align an image-receiving surface thereof in a vertical direction.

10. An apparatus according to claim 1, wherein said detector moving mechanism supports said radiation image detector rotatably about a predetermined vertical axis.

11. An apparatus according to claim 1, further comprising:
    a detection part for detecting a position of said radiation image detector relative to said top board;
    a driving part for moving said radiation image detector relative to said top board; and
    a controller for controlling the driving part based on a signal from said detection part.

12. An apparatus according to claim 11, further comprising an input part for inputting information corresponding to a target position of said radiation image detector, wherein said controller controls said driving part based on a result detected by said detection part and input information from said input part.

13. An apparatus according to claim 12, wherein said top board is provided with said input part.

14. An apparatus according to claim 11, further comprising:

a radiation generator;

a second detection part for detecting a position of said radiation generator; and a second driving part for moving said radiation generator, wherein said controller controls said second driving part based on a signal from said second detection part.

15. An apparatus according to claim 11, further comprising a radiation generator, wherein said controller controls a relative position between said radiation generator and said radiation image detector.

16. An apparatus according to claim 1, wherein said top board is provided with a display part for displaying a region corresponding to an image-receiving region of said radiation image detector.

17. An apparatus according to claim 1, wherein a bed is one selected from the group consisting of a radiographing table, an operating table, a table for an ICU, and an emergency stretcher.

* * * * *